United States Patent

Burton et al.

[15] 3,638,182

[45] Jan. 25, 1972

[54] RANDOM AND BURST ERROR-CORRECTING ARRANGEMENT WITH GUARD SPACE ERROR CORRECTION

[72] Inventors: Herbert O. Burton, Little Silver, N.J.; Sudhakar M. Reddy, Iowa City, Iowa; Daniel D. Sullivan, Howell Township, Monmouth County; Shih Y. Tong, Middletown, both of N.J.;

[73] Assignee: Bell Telephone Laboratories, Incorporated, Murray Hill, N.J.

[22] Filed: Jan. 2, 1970

[21] Appl. No.: 325

[52] U.S. Cl. ........ 340/146.1, 325/41

[51] Int. Cl. ........ G06f 11/12

[58] Field of Search ........ 340/146.1; 235/153; 178/23.1; 325/41

[56] References Cited

UNITED STATES PATENTS 3,418,630 12/1968 Van Duuren ........ 340/146.1

3,469,236 9/1969 Gallager ........ 340/146.1

*Primary Examiner*—Charles E. Atkinson

*Attorney*—R. J. Guenther and Kenneth B. Hamlin

[57] ABSTRACT

Information sequences are encoded in a first block code capable of correcting a certain number of random errors. Portions of previously encoded information sequences or sequences derived therefrom are, in turn, encoded into a second block code which is a shortened version of a super code of the first block code. These encoded portions are added to the code words of the first block code and the resultant sequences are transmitted to a receiving station. At the receiving station, each received sequence is decoded to determine if the number of random errors is less than a certain threshold value related to the error-correcting ability of the first block code. If so, the sequence is corrected using a random error-correcting technique. If not, the information portion of the sequence is replaced with information derived from subsequently received sequences (i.e., sequences which are in the guard space). Random errors which may have occurred in these subsequently received sequences are corrected prior to such replacement utilizing the super code.

13 Claims, 11 Drawing Figures

INVENTORS H. O. BURTON
S. M. REDDY
D. D. SULLIVAN
S. Y. TONG

BY R C Lipton
ATTORNEY

FIG. 6A $$G_1 = \begin{bmatrix}
1 & & & & & & & & & & 1 & 1 & 1 & 1 & 0 & 0 & 1 & 1 & 1 & 1 \\
 & 1 & & & & & & & & & 1 & 0 & 0 & 1 & 0 & 1 & 0 & 0 & 1 & 1 \\
 & & 1 & & & & & & & & 1 & 0 & 1 & 0 & 0 & 1 & 1 & 1 & 0 & 1 \\
 & & & 1 & & & & & & & 1 & 0 & 1 & 1 & 1 & 1 & 1 & 0 & 1 & 0 \\
 & & & & 1 & & & & & & 0 & 1 & 0 & 1 & 1 & 1 & 1 & 1 & 0 & 1 \\
 & & & & & 1 & & & & & 1 & 1 & 0 & 0 & 0 & 0 & 1 & 0 & 1 & 0 \\
 & & & & & & 1 & & & & 0 & 1 & 1 & 0 & 0 & 0 & 0 & 1 & 0 & 1 \\
 & & & & & & & 1 & & & 1 & 1 & 0 & 1 & 1 & 1 & 0 & 1 & 1 & 0 \\
 & & & & & & & & 1 & & 0 & 1 & 1 & 0 & 1 & 1 & 1 & 0 & 1 & 1 \\
 & & & & & & & & & 1 & 1 & 1 & 0 & 1 & 1 & 0 & 1 & 0 & 0 & 1
\end{bmatrix}$$

FIG. 6B $$G_0 = \begin{bmatrix}
1 & & & & & & & & & & & & & & & 0 & 0 & 1 & 1 & 0 \\
 & 1 & & & & & & & & & & & & & & 0 & 0 & 0 & 1 & 1 \\
 & & 1 & & & & & & & & & & & & & 1 & 0 & 0 & 1 & 1 \\
 & & & 1 & & & & & & & & & & & & 1 & 1 & 0 & 1 & 1 \\
 & & & & 1 & & & & & & & & & & & 1 & 1 & 1 & 1 & 1 \\
 & & & & & 1 & & & & & & & & & & 1 & 1 & 1 & 0 & 1 \\
 & & & & & & 1 & & & & & & & & & 1 & 1 & 1 & 0 & 0 \\
 & & & & & & & 1 & & & & & & & & 0 & 1 & 1 & 1 & 0 \\
 & & & & & & & & 1 & & & & & & & 0 & 0 & 1 & 1 & 1 \\
 & & & & & & & & & 1 & & & & & & 1 & 0 & 0 & 0 & 1 \\
 & & & & & & & & & & 1 & & & & & 1 & 1 & 0 & 1 & 0 \\
 & & & & & & & & & & & 1 & & & & 0 & 1 & 1 & 0 & 1 \\
 & & & & & & & & & & & & 1 & & & 1 & 0 & 1 & 0 & 0 \\
 & & & & & & & & & & & & & 1 & & 0 & 1 & 0 & 1 & 0 \\
 & & & & & & & & & & & & & & 1 & 0 & 0 & 1 & 0 & 1
\end{bmatrix}$$

$$G_2 = \begin{bmatrix}
1 & & & & & 1 & 1 & 0 & 1 & 0 \\
 & 1 & & & & 0 & 1 & 1 & 0 & 1 \\
 & & 1 & & & 1 & 0 & 1 & 0 & 0 \\
 & & & 1 & & 0 & 1 & 0 & 1 & 0 \\
 & & & & 1 & 0 & 0 & 1 & 0 & 1
\end{bmatrix}$$

RANDOM AND BURST ERROR-CORRECTING ARRANGEMENT WITH GUARD SPACE ERROR CORRECTION

BACKGROUND OF THE INVENTION

1. Field of the Invention

This invention relates to data transmission and processing systems and more particularly to error detection and correction in such systems.

2. Description of the Prior Art

The need for accurate transmission and processing of digital data is well recognized in such areas as telegraphy, telephony, and computer and automation technology. A variety of methods have been developed for improving the accuracy of transmission. Such methods range from simple single-bit error detecting schemes requiring the appending of a single bit to each data character or word to be transmitted to more elaborate schemes of error correction requiring the numerous interspersing of parity check bits among the information bits.

Since telephone transmission lines are subject to both random errors (errors occurring randomly throughout the transmitted data) and burst errors (errors occurring in "bunches"), considerable interest has centered on finding efficient arrangements for correcting both types of errors. Most prior arrangements for correcting either burst errors or both random and burst errors have required a large data storage capacity at the receiving terminal. This is because such arrangements generally require a rather large guard space of error-free digits between error bursts in order to correct the erroneous digits. Therefore, a large amount of received data normally must be stored prior to decoding. One arrangement which goes far in overcoming this problem is described in a copending application by S. Y. Tong, Ser. No. 787,496, filed Dec. 27, 1968. The Tong arrangement provides for correcting both random and burst errors and yet has a relatively small data storage requirement. The arrangement does require, however, that there be an error-free guard space between the error bursts in order to correct the bursts.

SUMMARY OF THE INVENTION

In view of the above described prior art arrangements, it is an object of the present invention to provide a random and burst error-correcting system having a small receiving terminal storage requirement.

It is another object of the invention to provide a system wherein an error-free guard space is not required and, more specifically, wherein guard space errors as well as random and burst errors can be corrected.

These and other objects of the present invention are realized in a specific illustrative system embodiment which includes a transmitting and receiving terminal connected by a noisy communication channel. The transmitting terminal includes an encoder which is arranged to encode blocks of information characters from an information source into code words of a first block code having a certain random error-correcting capability. Portions of previously encoded information blocks or blocks derived therefrom are encoded into code words of a second block code which is a shortened version of a super code of the first block code. These encoded portions are added to the code words of the first block code and the resultant sequences are transmitted via the communication channel to the receiving terminal.

Each received block is decoded to determine if the number of errors therein is less than a certain threshold value related to the error-correcting capability of the first block code. If so, any errors are corrected in a conventional error-correcting manner and the corrected blocks of information are stored. If not, subsequently received blocks which are in the guard space are decoded in accordance with the above noted super code, random errors therein are corrected, and information derived from such subsequent blocks is utilized to derive an information block to replace the erroneous block.

BRIEF DESCRIPTION OF THE DRAWINGS

A complete understanding of the present invention and of the above and other objects and advantages thereof, may be gained from the consideration of the following detailed description of specific illustrative embodiments presented hereinbelow in connection with the accompanying drawings in which:

FIGS. 6A and 6B show generator matrices for the codes utilized by the system of FIGS. 4, 5A and 5B.

DETAILED DESCRIPTION

Figure 1A:
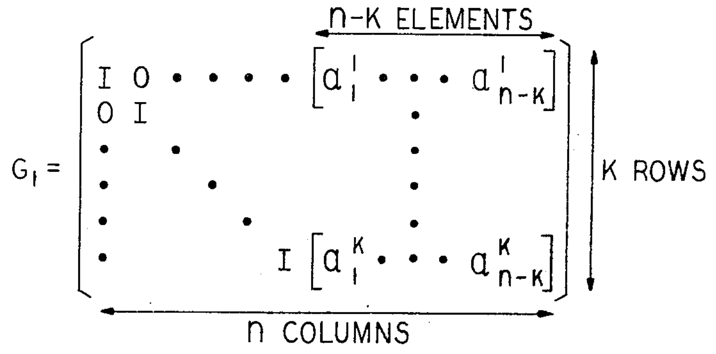
FIGS. 1A through 1C show generalized generator matrices for various block codes.

Before discussing the drawings in detail, it will be helpful to briefly discuss various methods of algebraically representing codes and coding processes. In general, a block code may be defined by what is termed a generator matrix. See Peterson, W. W., "Error-Correcting Codes," The M.I.T. Press, 1961, Chapter 3. These generator matrices are generally of the form shown in the FIG. 1A consisting of $k$ rows and $n$ columns. Such an $n$ by $k$ matrix would define a $(n,k)$ block code where $k$ represents the number of information symbols per block and $n$ represents the total number of symbols per block. The symbol I in the FIG. 1A matrix represents the identity element or symbol of the alphabet of the code. The various code words of the code may be generated by representing the $k$-symbol information sequences to be encoded as $k$-symbol row matrices and then multiplying the generator matrix by these row matrices. The resultant row matrices each consist of $n$ symbols representing a code word of the corresponding encoded $k$-symbol information sequence.

Information sequences may be represented by algebraic polynomials as well as by matrices. For example, a $k$-character information sequence may be represented by a polynomial of the form, $$A(x)=a_0+a_1x+\ldots+a_{k-1}x^{k-1}.$$

The coefficients $a_0$, $a_1$, . . . $a_{k-1}$ represent the symbol components of the information sequence. In the binary case, these coefficients are either "0" or "1." For example, the binary sequence 101101 may be represented by the polynomial $1+x^2+x^3+x^5$. With such representation, the information bits corresponding to the high-order coefficients are thought of as being transmitted first.

Cyclic codes, which are a subclass of block codes, may be defined in terms of a so-called generator polynomial $G(x)$ of degree $n-k$ as well as by a generator matrix. See the aforecited Peterson text, Chapter 8. The generator polynomial, in turn, defines certain shift register circuitry interconnections utilized in the encoding and decoding apparatus for cyclic codes.

Figure 1B:
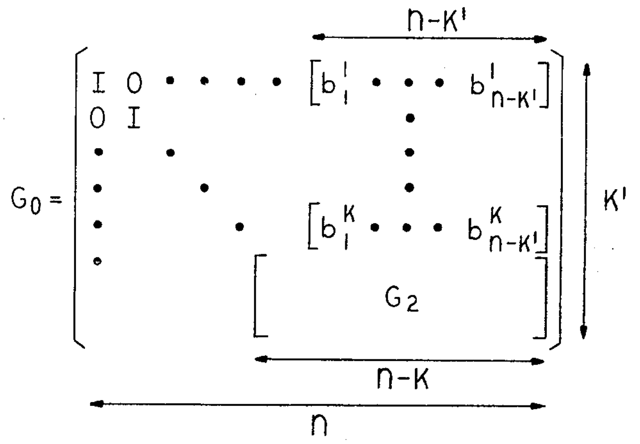
Figure 1C:
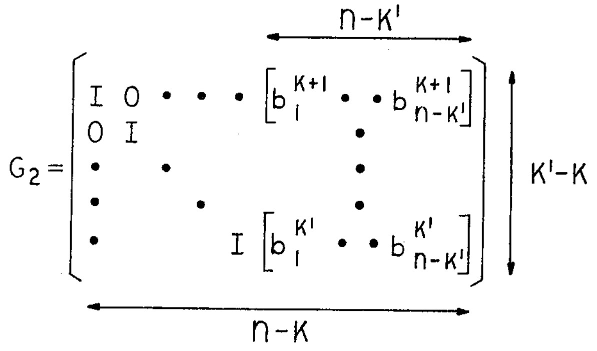

An illustrative algebraic description of the present invention will now be given using the representations discussed above. As indicated earlier, blocks or sequences of information characters are encoded into a first block code $C_1$ which may be represented by the generator matrix of FIG. 1A, i.e., the code $C_1$ is an $(n,k)$ block code. The code $C_1$ is a subcode of an $(n,k')$ block code $C_0$, (i.e., all the code words of $C_1$ are also code words of $C_0$), where $C_0$ is defined in accordance with the generator matrix shown in FIG. 1B and where $K<k'$. The submatrix $G_2$ shown within the matrix $G_0$ of FIG. 1B, in turn, defines another code $C_2$. The code $C_2$ is an $[(n-k), (k'-k)]$ code of either the systematic or non-systematic type. A $G_2$ matrix defining such a systematic code is shown in FIG. 1C. The code $C_2$ is merely a "shortened" form of the code $C_0$. The encoding operation of the present invention will now be discussed with reference to codes $C_1$ and $C_2$.

Let $I_j$ represent the $j^{th}$ block of information characters, where $j=0, 1\ldots$ Assume that the information block $I_{fl}$ is to be encoded and that previous blocks $I_0, I_1, \ldots I_{fl-1}$ have already been encoded, where $l$ is any integer and represents the degree of interleaving, $f=[k/(k'-k)]$, and $[x]$ represents the least integer equal to or greater than $x$. (The parameters $k$ and $k'$ are, of course, defined in FIGS. 1A–1C.) The encoding of $I_{fl}$ is carried out by first multiplying the generator matrix $G_1$ by $I_{fl}$ to obtain a code word $C_{fl}^1$ consisting of $k$ information symbols and $n-k$ parity symbols. Portions of every $l^{th}$ one of the previously encoded information blocks—designated $I_0^f$, $I_l^{f-1}$, . . ., $I_{(f-1)l}^1$, where $I_0^f$ represents the last $k'-f(k'-k)$ symbols in the information block $I_0$ and the remaining $I_j^i$ represents the $i^{th}$ group of $k'-k$ symbols of the information block $I_j$—are then added together and encoded by multiplying the generator matrix $G_2$ by $I_0^f+I_l^{f-1}+\ldots+I_{(f-1)l}^1$ to obtain a code word $C_{fl}^2$ consisting of $k'-k$ information symbols and $n-k'$ parity symbols. $C_{fl}^2$ is then added to the parity section of $C_{fl}^1$ to obtain $M_{fl}$ which is a code word in $C_0$ since both $C_{fl}^1$ and $C_{fl}^2$ are in $C_0$. $M_{fl}$ is then transmitted via a communication channel to a receiving station.

Figure 1D:
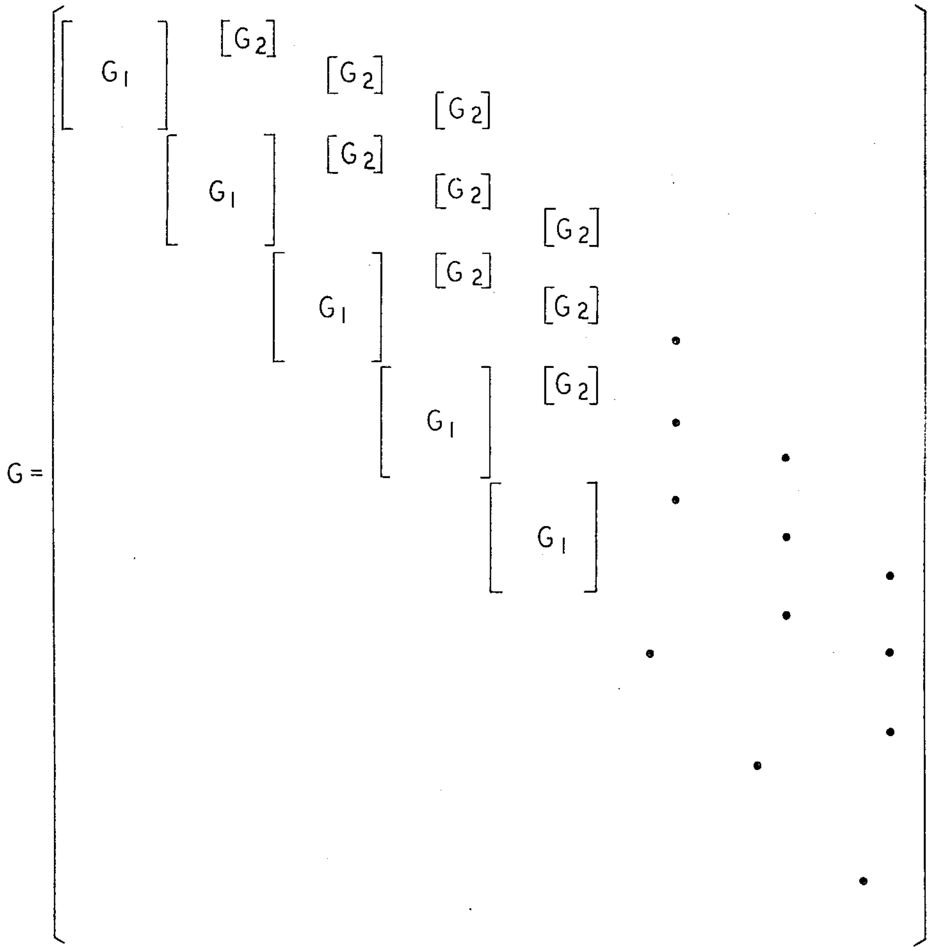
FIG. 1D shows a generalized generator matrix for a convolution code.

The result of the encoding process described above is to encode information symbols into a type of convolution code defined by the semiinfinite matrix shown in FIG. 1D. (Convolution or recurrent codes are described in detail in an article by A. D. Wyner and R. B. Ash, entitled "Analysis of Recurrent Codes," in *IEEE Transactions On Information Theory*, July, 1963, pages 143–156.) The FIG. 1D matrix illustrates an encoding process with interleaving of degree $l=1$. For interleaving greater than this, the $G_2$ matrices shown within the matrix of FIG. 1D would be spaced further apart.

At the receiving terminal, the sequence $M_{fl}^*$ (representing the transmitted sequence $M_{fl}$ including any errors that may have occurred in transmission) is received and registered. The previously transmitted $fl-1$ sequences were also received, stored, and processed to determine if the number of random errors in each sequence was equal to or less than a predetermined threshold value related to error-correcting capability of the code $C_1$. This threshold value may be chosen to be any number equal to or less than the error-correcting capability of the code $C_1$. If a sequence was found to contain more errors than the threshold value, then an indication was stored in a tracer storage unit that the sequence was incorrect. Alternatively, if a sequence was found to contain the same or less errors than the threshold value, then the sequence was corrected and an indication stored in the tracer storage unit that the sequence was correct.

If upon receipt of the sequence $M_{fl}^*$, the tracer unit indicates that every $l^{th}$ one of the previously received sequences—$M_0^*$, $M_l^*$, . . ., $M_{(f-1)l}^*$ —is correct, then portions of the information blocks $I_0^f$, $I_l^{f-1}$, . . ., $I_{(f-1)l}^1$ of these sequences are added together, encoded into a code word of the code $C_2$, and subtracted from the parity section of $M_{fl}^*$ to obtain the code word $C_{fl}^1$. $C_{fl}^1$ is then decoded in accordance with the code $C_1$. If the number of errors in $C_{fl}^1$ does not exceed the aforementioned threshold value, then $C_{fl}^1$ is corrected and the information portion of $C_{fl}^1$, i.e., $I_{fl}$, is stored at the receiving terminal and an indication is stored in the tracer storage unit indicating that the sequence $M_{fl}^*$ is correct. If it is determined upon decoding that the number of errors in $C_{fl}^1$ exceeds the threshold value, then an indication is stored in the tracer unit indicating that the sequence $M_{fl}^*$ is uncorrectable. Correction of sequences indicated as being uncorrectable by the tracer storage unit will now be described as follows.

Assume that the sequence $M_{zl}^*$ is indicated by the tracer unit as being uncorrectable and that $M_{fl}^*$ has just been received, where $z$ is an integer such that $0\leq z\leq (f-1)l$. $M_{fl}^*$ is first decoded in accordance with the code $C_0$ defined by the generator matrix shown in FIG. 1B to correct random errors which may have occurred therein. ($M_{fl}^*$ is in the guard space of the sequence $M_{zl}^*$.) Portions of certain stored information blocks, specifically $I_0^f$, $I_l^{f-1}$, . . ., $I_{(z-1)l}^{f-z+1}$, $I_{(z+1)l}^{f-z-1}$, . . ., $I_{(f-1)l}^1$ (note that no portion of $I_{zl}$ is included), are then added together, encoded into a code word of the code $C_2$, and subtracted from the parity section of the corrected version of $M_{fl}^*$. The syndrome of the resulting sequence is then calculated in accordance with the code $C_1$. The $k'-k$ high order symbols of this syndrome constitute a correct version of $I_{zl}^{f-z}$ and these symbols are substituted for the stored version of $I_{zl}^{f-z}$. The other $f-1$ portions of $I_{zl}$ are obtained in a similar fashion from already received and/or subsequently received sequences and substituted for the corresponding stored portions. In this manner, random errors occurring in the guard space of transmitted sequences can be corrected thereby facilitating the correction of burst errors without the attendant requirement of an error-free guard space.

Figure 2:
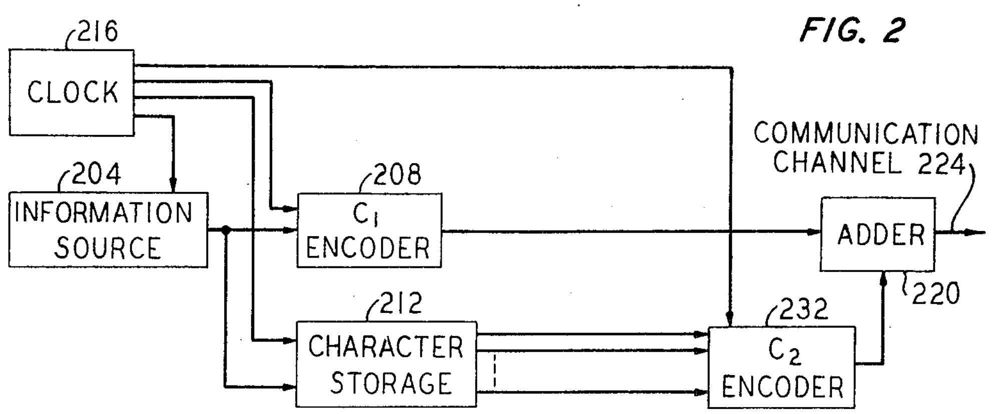
FIGS. 2 and 3 show a generalized illustrative random and burst error-correcting system made in accordance with the principles of the present invention.
Figure 3:
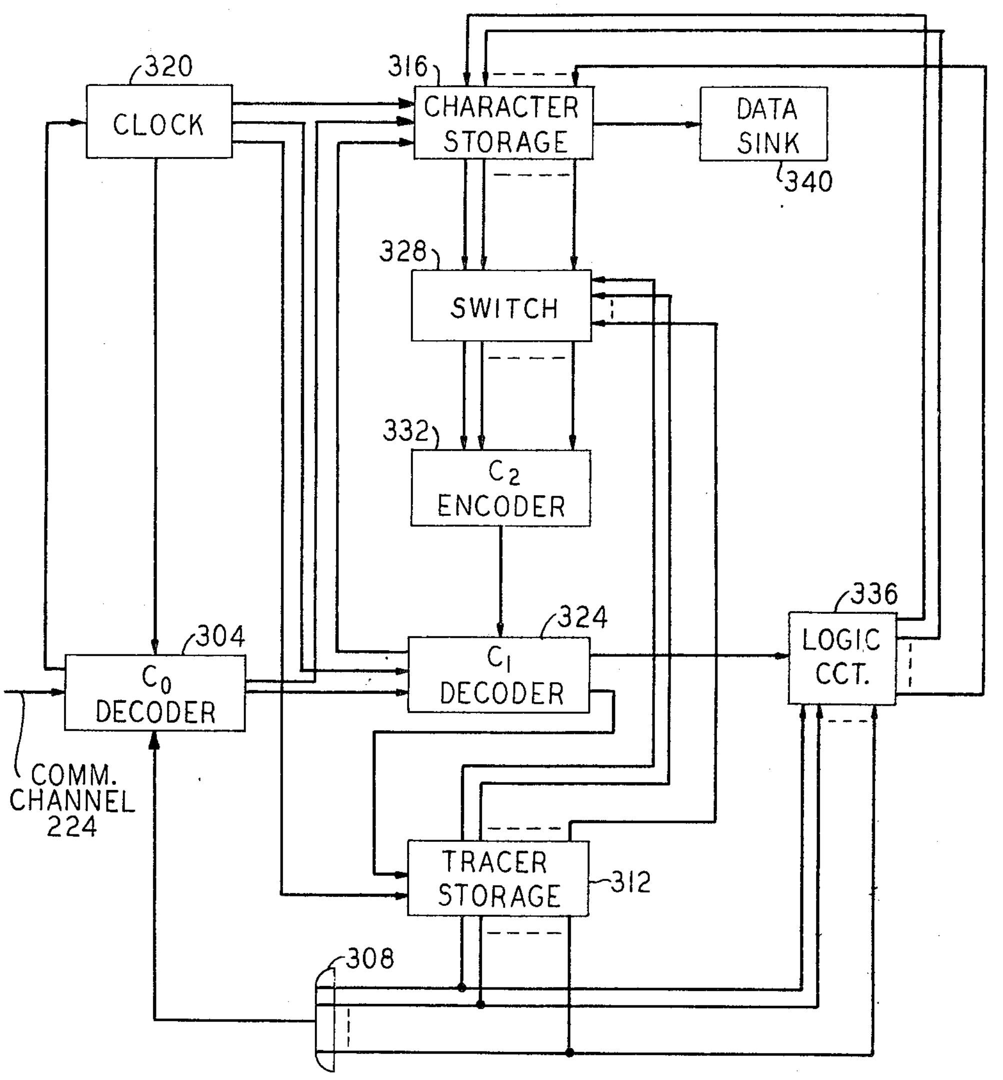

A generalized illustrative embodiment for carrying out the above described operations for the codes there described is shown in FIGS. 2 and 3. Blocks of information characters from an information source 204 of FIG. 2 are encoded into an $(n,k)$ block code $C_1$. The information blocks are also applied to a character storage unit 212 which temporarily stores a number of the information blocks. The information characters are applied by the encoder 208 via an adder 220 to a communication channel 224. While the information characters are being encoded by the encoder 208, portions of every $l^{th}$ block of the group of $fl$ most recently transmitted information blocks are applied by the character storage unit 212 to an encoder 232. The encoder 232 encodes the portions into code words of an $([n-k], [k'-k])$ code $C_2$. (The portions here referred to were designated earlier as $I_0^f$, $I_l^{f-1}$, . . ., $I_{(f-1)l}^1$). The resultant $C_2$ code words are applied to the adder 220 simultaneously with the application thereto of the parity characters generated by the encoder 208. Each parity section of a $C_1$ code word from the encoder 208 is added by the adder 220 to a $C_2$ code word and applied to a communication channel 224.

Referring now to FIG. 3, the transmitted sequences are received via the channel 224 by a decoder 304. If sequences have previously been received, then an indication as to whether or not these sequences are correct or incorrect is stored in a tracer storage unit 312. If, for example, it is determined that the number of errors in a particular sequence exceeds a certain threshold (as determined by processing to hereafter be discussed) then a "1" is stored in the tracer storage unit 312 in a position associated with that sequence. On the other hand, if a received sequence contains the same or fewer errors than the threshold number (and thus a number capable of being corrected immediately), then a "0" is stored in the tracer storage unit 312. (Hereafter, the term "high" signal will be used interchangeably with the "1" signal and the term "low" signal interchangeably with the "0" signal.)

After receipt of a sequence by the decoder 304, the tracer storage unit 312 applies a signal to OR-gate 308 indicating whether or not every $l^{th}$ sequence of the group of $fl$ most recently received sequences is correct. If all are correct, then all "low" signals are applied via OR-gate 308 to the decoder 304 indicating that the received sequence is to be applied unchanged by the decoder 304 to the decoder 324. While this is taking place and prior to the application of this sequence to the decoder 324, portions of every $l^{th}$ one of the $fl$ previously received information blocks are applied via a switch 328 in response to a signal from the tracer storage unit 312 to an encoder 332. The encoder 332 encodes these portions into a code word of the code $C_2$ (which is the same code $C_2$ utilized in the encoder of FIG. 2). This code word is then subtracted from the parity portion of the recently received sequence as it is applied by the decoder 304 to the decoder 324. The decoder 324 then decodes the sequence and if the number of errors is equal to or less than the aforementioned threshold value, it corrects the errors, applies the corrected information block to the character storage 316, and applies a "0" to the tracer storage unit 312 indicating that the just received sequence is correct. If the decoder 324 determines that the number of errors exceeds the threshold value, then it applies a "1" to the tracer storage unit 312 indicating that the received sequence is in error.

If one of the group of every $l^{th}$ sequence of the $fl$ previously received sequences is incorrect, then the tracer storage unit 312 applies a "high" signal via OR-gate 308 to the decoder 304 thereby signaling the decoder 304 to decode the recently received sequence in accordance with the $C_0$ code described earlier. The decoder 304 decodes the sequence and corrects any random errors which may be occurred in the block in accordance with the error-correcting capability of the $C_0$ code. While this is taking place, the tracer storage unit 312 signals the switch 328 to allow portions of every $l^{th}$ one of the $fl$ previously received information blocks (except the information block of the sequence indicated as being incorrect) to be applied by the character storage unit 316 to the encoder 332. These portions are then encoded by the encoder 332 into a code word of code $C_2$ and applied to the decoder 324. The decoder 324 subtracts the $C_2$ code word from the corrected version of the just received sequence as it is applied by the decoder 304. The syndrome of the resulting sequence is then calculated by the $C_1$ decoder. This syndrome gives a correct version of one portion of the information block of the sequence indicated as being incorrect. Specifically, the first $k'-k$ positions of the syndrome give this correct version. The decoder 324 applies this portion of the syndrome to a logic circuit 336 which then substitutes this portion for the corresponding portion of the stored block. The other portions of the stored block are generated in a like manner from previously and/or subsequently received sequences until the entire stored block has been replaced and any errors therein corrected. The correct information blocks are then applied by the character storage unit 316 to a data sink 340.

Figure 4:
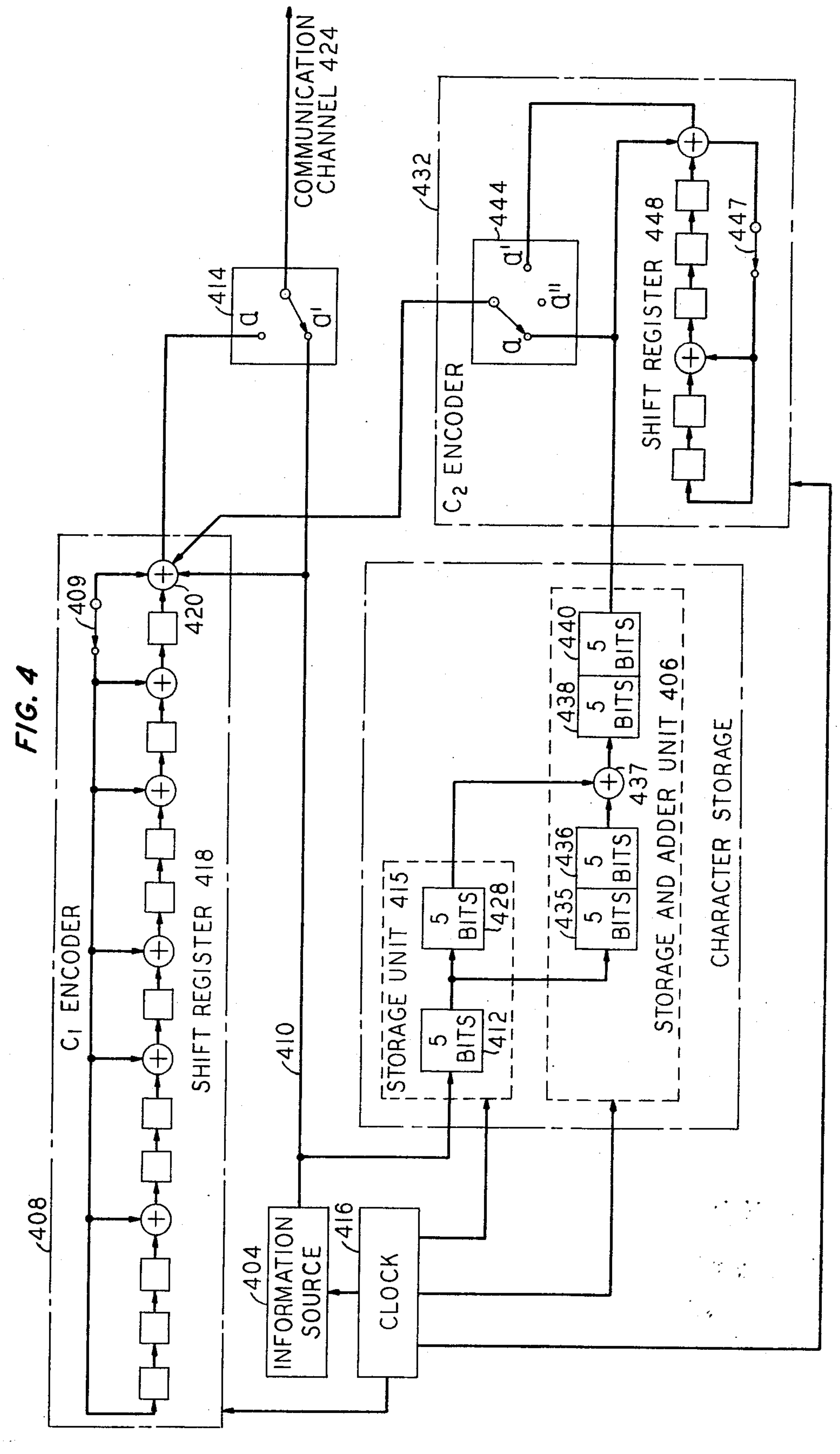
FIGS. 4, 5A and 5B show a specific illustrative random and burst error-correcting system utilizing (20,10) and (10,5) shortened cyclic codes.
Figure 5A:
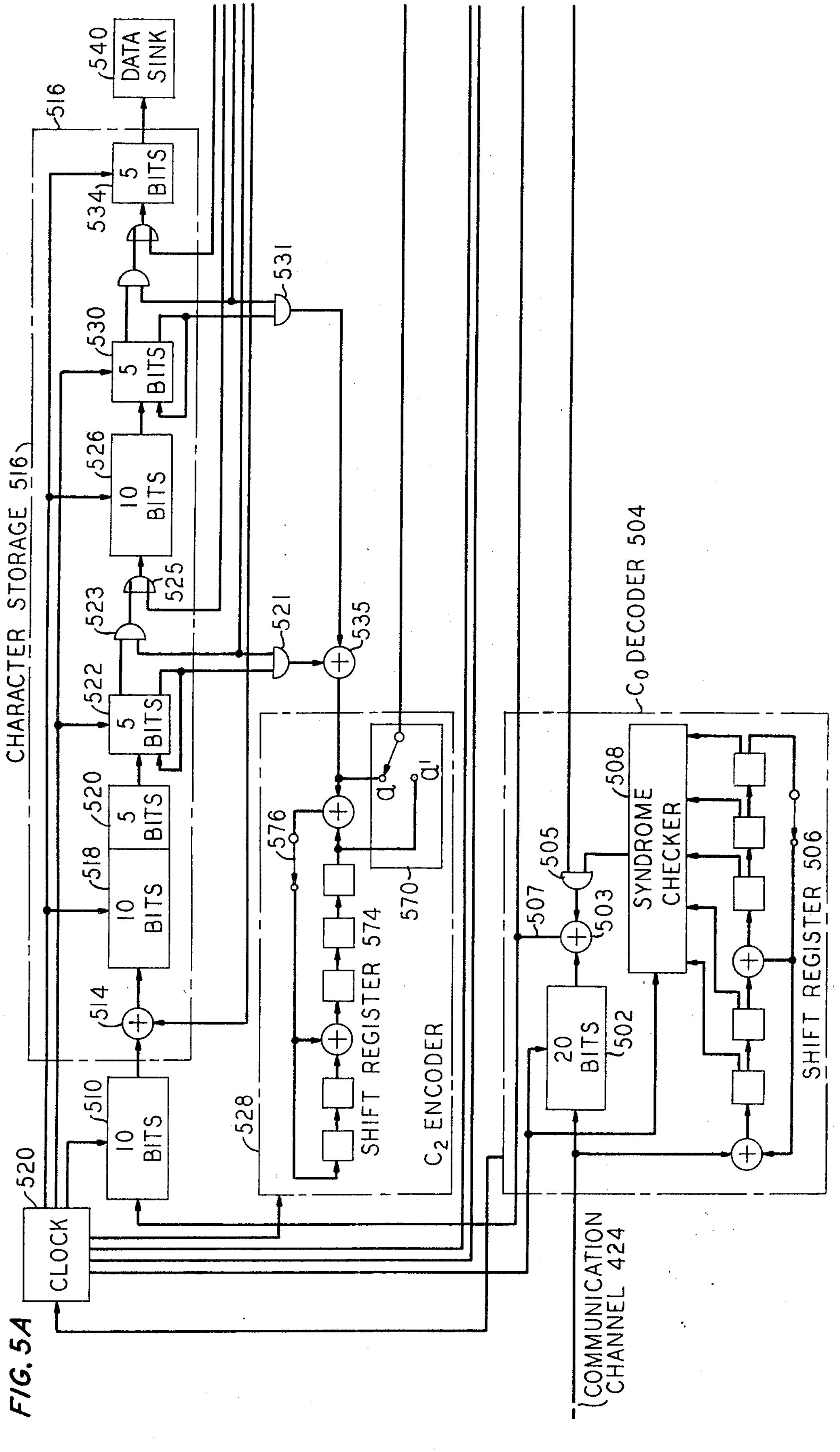
Figure 5B:
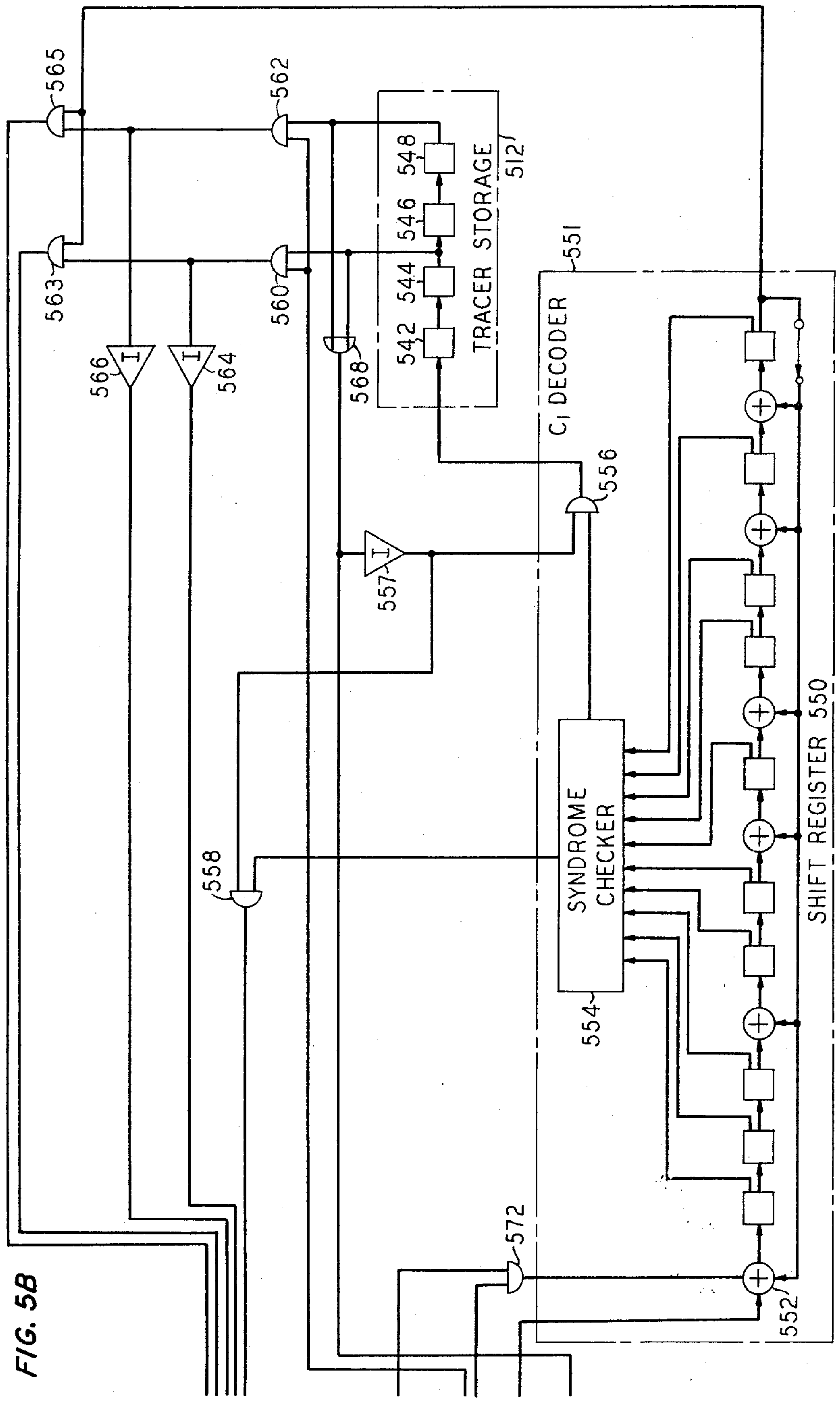

A specific illustrative embodiment of a system for utilizing the principles of the present invention is shown in FIGS. 4 and 5. The system there shown utilizes as the $C_1$ code a binary (20,10) shortened cyclic code and as the $C_2$ code a binary (10,5) shortened cyclic code. The interleaving degree is chosen to be $l=2$. The $C_1$ code is capable of correcting two errors per block or of correcting one error and detecting three errors per block. The system is capable of correcting single random errors in the guard space, of correcting burst errors that occupy two 20-bit blocks provided that the bursts are detectable and that the four 20-bit blocks following the burst each contain no more than a single random error, and of correcting either single random errors and detecting triple random errors or of correcting double random errors and detecting some other random errors (the choice is in the user). Matrices $G_1$ and $G_2$ which define the codes $C_1$ and $C_2$, respectively, are shown in FIGS. 6A and 6B. The code $C_0$ of which $C_2$ is a shortened version and of which $C_1$ is a subcode is defined by the generator matrix $G_0$ shown in FIG. 6B. The generator polynominal for the $C_1$ code is $g_1(x)=x^{10}+x^9+x^8+x^6+x^5+x^3+1$ and the generator polynomial for the $C_2$ code is $g_2(x)=x^5+x^2+1$. It is noted that the generator polynomial $g_2(x)$ divides the generator polynomial $g_1(x)$ in accordance with the requirement that the code $C_1$ be a subcode of a code $C_0$ from which the code $C_2$ is a shortened version.

Referring now to FIG. 4, an information source 404 in response to a clock 416 applies 10-bit information blocks to a storage unit 415, to a modulo-2 adder 420, and to a switch 414. During the application of the information block, the switch 414 is closed on the $a'$ contact thereby enabling the transfer of the information block to a communication channel 424. While the information block is being applied to the modulo-2 adder 420, a switch 409 is in the closed position thereby providing a feedback path in a shift register 418 to enable the generation of a 10-bit parity word by the shift register 418 during this time, switch 444 is in the open or $a''$ position. After a 10-bit information block has been applied to the shift register 418, the switch 409 is put in the open position, the switch 414 is closed on contact $a$, and the contents of the shift register 418 are applied sequentially to the modulo-2 adder 420. Simultaneously therewith, the sum of portions of two previously transmitted information blocks stored in five-bit register 440 is applied via a switch 444 which is closed on its contact $a$ to the modulo-2 adder 420. This sum is of the second five bits of the block transmitted four blocks previously and the first five bits of the block transmitted two blocks previously. These portions were added together by the modulo-2 adder 437.

In addition to the sum being applied to the modulo-2 adder 420 where it is added to the first five bits of the parity word generated by the shift register 418, it is also applied to a shift register 448 which generates a five-bit parity word in accordance with the $C_2$ code. (At this time, a switch 447 is in the closed position). After the five-bit parity word is generated, the switch 447 is opened, the switch 444 is closed on its contact $a'$ and the parity word is applied to the modulo-2 adder 420 where it is added to the second five bits of the parity word generated by the shift register 418. In this manner, the sum of portions of two previously transmitted information blocks is encoded into a code word of the $C_2$ code and added to the parity portion of a code word of the $C_1$ code. The resultant of this addition is applied by the modulo-2 adder 420 via the switch 414, which is closed on its contact $a$, to the communication channel 424. It should be noted here that the feedback connections of shift registers 418 and 448 are determined by the generator polynomials $G_1(x)$ and $G_2(x)$, respectively. See the aforecited Peterson text, Chapter 7.

To illustrate the above operation more clearly, assume that the information block just being applied by the information source 404 to the storage unit 415, the modulo-2 adder 420 and the switch 414 is the information block $I_4$. In this case, previously transmitted information would be stored in the storage and adder unit 406 as follows. The sum $I_0^2+I_2^1$, where $I_j^i$ represents the $i^{th}$ group of five bits of the information block $I_j$, is stored in register 440. The sum $I_1^2+I_3^1$ is stored in register 438. The portion $I_2^2$ is stored in register 436 and the portion $I_3^2$ is stored in register 435. As the information block $I_4$ is applied to line 410, portions $I_4^1$ and $I_4^2$ are shifted respectively into registers 428 and 412. After $I_4$ has been applied to the communication channel 424, the contents of the registers in the storage and adder unit 406 and the contents of storage unit 415 are shifted five bits to the right so that $I_0^2+I_2^1$ stored in register 440 is applied via switch 444 which is closed on contact $a$ to the modulo-2 adder 420, $I_1^2+I_3^1$ stored in register 438 is shifted to register $I_4^1$ stored in register 428 and $I_2^2$ stored in register 436 are added by a modulo-2 adder 437 and the sum is shifted into register 438; and $I_4^2$ is shifted into register 435. The sum $I_0^2+I_2^1$ is added by a modulo-2 adder 420 to the first five bits of the parity word generated for the information block $I_4$ by the shift register 418 and the resultant is applied to the communication channel 424. Simultaneously with this addition, the sum $I_0^2+I_2^1$ is applied to the shift register 448 which generates a five-bit parity word therefor. Switch 444 is then closed on contact $a'$ and the five-bit parity word for $I_0^2+I_2^1$ is applied by the shift register 448 (while switch 447 is open) to the modulo-2 adder 420 where it is added to the last five bits of the parity word of the information block $I_4$. This resultant is then applied to the communication channel 424. The transmitted block thus consists of the information block $I_4$ and a 10-bit parity block which has been modified by the addition thereto of the *encoded* sum $I_0^2+I_2^1$. Following this transmission, the information source may apply the next information block $I_5$ to the line 410 and the process is repeated.

Each encoded 20-bit block applied to the communication channel 424 is received and registered in a register 502 shown in FIG. 5. Assume now that the information blocks $I_0$, $I_1$, $I_2$, and $I_3$ with their appropriate parity bits have been received and processed by the apparatus of FIG. 5. This processing which will be discussed below includes a determination as to whether or not any of the information blocks $I_0$, $I_1$, $I_2$, and $I_3$ contain greater than a certain threshold number of random errors. The threshold number in this case could be either zero, (since we could use the burst mode to correct all errors) one, or two since the random error-correcting capability of the code $C_1$ is two. Assuming then that the threshold number is one, if it were determined that any of the information blocks contain more than one error, then a "1" would be stored in a tracer storage unit 512 in a position corresponding to the information block in question. For example, if it were determined that the information block $I_0$ (presently stored in registers 530 and 534 of the character storage unit 516) contained more than one random error, then a "1" would now be stored in position 548 of the tracer storage unit 512. If it is determined that the information blocks do not contain more than one random error, then any error that is present is corrected and a "0" is stored in the tracer storage unit 512 in a position corresponding to the information block in question. At this stage of the processing under the conditions assumed above, the information block $I_0$, as indicated, is stored in registers 530 and 534, the information block $I_1$ is stored in register 526, the information block $I_2$ is stored in registers 520 and 522, and the information block $I_3$ is stored in register 518.

Now assume that "0's" are stored in position 544 and 548 of the tracer storage unit 512 and that the information block $I_4$ with parity bits is received and registered in the register 502. In response to clock pulses from a clock 520, the register 502 applies $I_4$ plus its parity bits to a modulo-2 adder 503 and then to a line 507. Since "0's" are stored in positions 544 and 548 of the tracer storage unit 512, AND-gate 505 is not enabled and thus the information block $I_4$ plus parity bits are transferred via the modulo-2 adder 503 unaffected to line 507. From there, the information block $I_4$ is applied both to a register 510 and registered therein and to a modulo-2 adder 552 and then to a shift register 550. While the shifting of $I_4$ into shift register 550 is taking place and prior to the shifting of the parity bits of $I_4$ into the register 550, processing of data in other parts of the FIG. 5 apparatus is taking place as follows.

With the presence of "0's" in positions 544 and 548 of the tracer storage unit 512, AND-gates 560 and 562, *not* being enabled, give "low" outputs which are inverted to "high" signals by inverters 564 and 566. These "high" signals enable AND-gates 521 and 531 and allow the passage therethrough of the contents of registers 522 and 530, respectively to a modulo-2 adder 535. Recall that the first five bits of the information block $I_2$, designated $I_2^1$, is registered in register 522 and that the last five bits of the information block designated $I_0$, $I_0^2$, is registered in register 530. The modulo-—2 adder 535 adds $I_2^1$ and $I_0^2$ and applies the resultant to an encoder 528 and to an AND-gate 572 via a switch 570 which is closed on its contact *a*, AND-gate 572 is enabled by a clock pulse to thereby pass the resultant to the modulo-2 adder 552 simultaneously with the application thereto of the first five bits of the parity word of $I_4$ received over line 507. The modulo-2 adder 552 then adds the sum $I_2^1+I_0^2$ to the first five bits of the parity word $I_4$ and shifts the new sum into the shift register 550.

While the sum $I_2^1+I_0^2$ is being applied to the modulo-2 adder 552, it is also being shifted into the shift register 574 of the encoder 528. Shifting the sum into the shift register 574 while a switch 576 is in the closed position results in the generation of five parity bits for the sum in accordance with the $C_2$ code. After these parity bits have been generated, switch 576 is opened, switch 570 is closed on its *a'* contact, and the parity bits are shifted to AND-gate 572 and to the modulo-2 adder 552. Simultaneously therewith, the last five parity bits of the information block $I_4$ are applied to the modulo-2 adder 552 and added to the parity bits from the encoder 528. This sum is then shifted into the shift register 550 and the contents of the shift register are shifted five bit positions to the right. In this manner the sum $I_2^1+I_0^2$ is encoded into a 10-bit code word and added to the parity word of $I_4$.

Shifting the information block $I_4$ plus its modified parity bits into the shift register 550 results in the generation of the syndrome of the information block $I_4$. This syndrome is then applied to a syndrome checker 554 which determines if the number of random errors in the sequence containing $I_4$ exceeds one. (The syndrome checker 554 could be of the type generally described in Berlekamp, E. R., "Algebraic Coding Theory," McGraw-Hill, 1968, Chapter 5.) If the number exceeds one, then the syndrome checker 554 applies a "1" via AND-gate 556 (which is enabled because of the presence of "0's" in character registers 544 and 548) to the tracer storage unit 512 causing the contents of the tracer storage unit to shift one position to the right. If on the other hand the number of errors does not exceed one, then the syndrome checker 554 generates a 10-bit error pattern word from the syndrome and applies it via AND-gate 558 (which is also enabled because of the presence of "0's" in registers 554 and 548 to the modulo-2 adder 514 just as the information block $I_4$ is shifted from the register 510 to the modulo-2 adder 514. The modulo-2 adder 514 adds the error pattern word to the information block $I_4$ thereby correcting any error which may have occurred in the information block and applies the corrected block to the register 518. Application of this corrected block to register 518, causes the contents of this register and the other registers of the character storage 516 to be shifted 10 bit positions to the right. In this fashion, single bit random errors in the transmitted data are corrected.

Now assume that the information block $I_2$ was determined to contain more than a single random error so that a "1" is now stored in position 544 of the tracer storage unit 512. In this case, it is necessary to replace the information block $I_2$ with subsequently received information. This is carried out as follows. The information block $I_4$ plus associated parity bits are received and applied to register 502 and also to a shift register 506. Shifting $I_4$ and its parity bits into the shift register 506 causes the generation of the syndrome of the received data in accordance with the $C_0$ code. (Since $C_2$ is a shortened version of $C_0$, the feedback connections of shift register 506 are the same as those of shift registers 574, i.e., both are determined from $g_2(x)$.) This syndrome is applied to a syndrome checker 508 where it is processed to determine whether or not a single random error has occurred in the sequence containing $I_4$ and if so what the error position is. If an error has occurred, the syndrome checker 508 applies a "1" to AND-gate 505 (which together with a "1" in position 544 enables the AND-gate) just as the erroneous bit is applied by the register 502 to the modulo-2 adder 503. The AND-gate 505 then applies the "1" to the modulo-2 adder 503 where it is added to the erroneous bit thereby correcting the bit.

The corrected version of the information block $I_4$ is next applied to register 510 and $I_4$ and its parity bits are applied to the modulo-2 adder 552. The presence of a "1" in position 544 of the tracer storage unit 512 and the application thereof via AND-gate 560 (in conjunction with an appropriate clock pulse from the clock 520) to an inverter 564 results in a "low" signal being applied to AND-gate 521. Thus, AND-gate 521 is not enabled and $I_2^1$ stored in register 522 is prevented from being applied to the modulo-2 adder 535. This is necessary since $I_2$ is indicated as being incorrect by the tracer storage unit 512. The presence of a "0" in position 548 of the tracer storage unit 512 and the application thereof via AND-gate 562 (in conjunction with an appropriate clock pulse from the clock 520) to the inverter 566 causes a "high" signal to be applied to AND-gate 531 thereby enabling the transfer of $I_0^2$ from register 530 to the modulo-2 adder 535. $I_0^2$ is then applied to the encoder 528 and via switch 570 which is closed on contact *a* to AND-gate 572 and then to the modulo-2 adder 552 where it is added to the *first* five bits of the parity word of the information block $I_4$. This sum is ultimately shifted into the rightmost five bit positions of the shift register 550. Assuming that there were no uncorrected random errors in the received sequence containing $I_4$, this sum consists of a correct version of $I_2^1$. Normally $I_2^1$ stored in register 522 would be subtracted out of $I_4$ but as discussed above this was prevented when AND-gate 521 was not enabled. Although the leftmost five bits to be registered in register 550 will not be used in the correction of $I_2$, an explanation of how the bits are obtained is here given to provide a complete description of the FIG. 5 arrangement. The encoder 528 generates a five-bit parity word for $I_0^2$ and applies this word via the switch 570 which is now closed on its contact $a'$ to the AND-gate 572 and then to the modulo-2 adder 552 where the word is added to the last five bits of the parity word of the information block $I_4$. The sum of the encoded $I_0^2$ and the parity word of $I_4$ is shifted into the shift register 550.

The $I_2^1$ presently in the rightmost five bit positions of shift register 550 is then applied via an AND-gate 563 (which is enabled because of the application thereto of the "1" from position 544 of the tracer storage unit 512) to an OR-gate 525 and then to the register 526. The contents of register 522 are prevented from being applied to the register 526 because AND-gate 523 is not enabled since the output of the inverter 564 is "low." Thus, the corrected version of $I_2^1$ derived from the received block $I_4$ and its parity bits is substituted for the erroneous version $I_2^1$ stored in register 522. While the corrected version $I_2^1$ is being shifted into register 526, the contents of the other registers are likewise shifted five bit positions to the right. Thus the second five bits of the information block $I_2$, i.e., $I_2^2$, stored in register 520 is shifted to register 522. After this takes place, the clock signal to AND-gate 560 is removed making the output of the inverter 564 "high." Thus, as the next shift of the character storage 516 takes place, the contents of register 522 in conjunction with the "high" signal from the inverter 564 enables AND-gate 523 allowing the passage therethrough of the contents of the register 522 to the register 526.

While $I_4$ was being shifted from register 510 to register 518, the "1" stored in tracer storage position 544 was transmitted through the OR-gate 568, causing the output of inverter 557 to be "low." This inhibited the output of AND-gates 558 and 556 and as a result, the $C_1$ decoder 551 was prevented from attempting to correct random errors at the modulo-2 adder 514 and was also prevented from inserting a "1" in tracer storage position 542. These actions are consistent with the assumption that errors in the received sequence containing $I_4$ have already been removed by the $C_0$ decoder.

The contents of the character storage 516 after the above takes place are as follows. The block $I_4$ is stored in register 518, $I_3$ is stored in registers 520 and 522, $I_2$ is stored in register 526, and $I_1$ is stored in registers 530 and 534. (It should be noted here that register 534 is not essential to the operation of FIG. 5 apparatus since the first five bits of each information block could be applied directly to a data sink 540. Including the register 534 enables the application of a whole information block at a time to the data sink 540.) The "1" previously stored in position 544 of the tracer storage unit 512 is now stored in position 546.

In order to complete the correction of the information block $I_2$ it is necessary that portion $I_2^2$ be replaced by subsequently received information. The subsequently received information from which $I_2^2$ would be derived would be $I_6$ and its parity bits. When $I_6$ and its parity bits were received by register 502, the information block $I_2$ would be stored in registers 530 and 534. Specifically, the portion $I_2^2$ would be stored in register 530. The information block $I_6$ and its parity bits would be processed in the same manner described above for the processing of the information block $I_4$ in which case the portion $I_2^2$ would be derived therefrom and substituted for the portion $I_2^2$ stored in register 530. Thus when the information block $I_2$ was shifted from the character storage 516 to the data sink 540, both the first five bits and the second five bits would have been replaced by information derived from subsequently received data.

The apparatus of FIG. 5, then, is capable of correcting more than one error in an $i^{th}$ block provided the errors in this block can be detected by the $C_1$ decoder 551 and provided the $(i+2)^{th}$ and $(i+4)^{th}$ blocks can be corrected by the $C_0$ decoder 504. Thus, burst errors in two adjacent blocks can be corrected provided the errors in both blocks can be detected by the $C_1$ decoder and these blocks are followed by four consecutive blocks whose errors can be corrected by the $C_0$ decoder.

What is claimed is:

1. In a data processing system including a transmitter, a receiver, a channel interconnecting said transmitter and receiver and a source of information blocks,
   - a first encoder for encoding said information blocks into code words of a first block code $C_1$ which is a subcode of code $C_0$ and for appending said code words to said information blocks to form the parity sections thereof,
   - storing means responsive to signals from said source of information blocks for storing a predetermined number of the most recently encoded information blocks,
   - a second encoder responsive to signals from said storing means for encoding portions of said stored blocks into code words of a second block code $C_2$ which is a shortened version of the code $C_0$,
   - adding means responsive to signals from said first and second encoders for adding the code words of the second block code to the parity section of the code words of the first block code to obtain resulting sequences which are code words of $C_0$, and
   - means for applying said resulting sequences to one end of said channel.

2. The system of claim 1 further including an input shift register connected to the other end of said channel for storing each of said resulting sequences as it is received from said channel,
   - correcting and detecting means responsive to signals from said input shift register for correcting $r$ or less errors in said information block portion of said resulting sequences and for detecting the existence of more than $r$ errors in said information block in accordance with the first block code $C_1$, where $r$ is the error-correcting capability of the first block code $C_1$,
   - decoding means responsive to signals from said correcting and detecting means for correcting errors in said information block in accordance with the code $C_0$, and
   - replacing means responsive to said correcting and detecting means for storing an ordered plurality of received resulting sequences and for replacing the information portion of a particular sequence with information derived from certain subsequently received sequences if greater than $r$ errors are detected in said particular sequence.

3. The system of claim 2 wherein said correcting and detecting means comprises indication storing means for storing an indication of a number of the most recently received sequences which include greater than $r$ errors and of those which include $r$ or less errors,
   - third encoding means responsive to selected ones of said recently received sequences (i) for encoding portions of those sequences into a first code word of said second block code $C_2$ when said indication storing means indicates that said selected ones of said recently received sequences each includes $r$ or less errors and (ii) for encoding portions of all but one of said selected ones of said recently received sequences into a second code word of said second block code $C_2$ when said indication storing means indicates that one sequence contains greater than $r$ errors, and
   - subtracting means responsive to said first code word from said third encoding means for correcting $r$ or fewer errors in said first resultant and for generating and applying a first signal to said indication storing means when the most recently received sequence includes $r$ less errors, and for generating and applying a second indication signal to said indication storing means when said most recently received sequence contains greater than $r$ errors.

4. The system of claim 3 wherein said replacing means comprises means for subtracting said second code word from the most recently received sequence which shall have been decoded by said decoding means and the errors therein corrected to obtain a second resultant, means responsive to signals from said means for subtracting for generating the syndrome of said second resultant in accordance with said first block code, and means responsive to signals from said means for generating for substituting a portion of the information section of said one sequence with a portion of said syndrome.

5. The system of claim 1 wherein said first block code $C_1$ is a code defined by an $n$ by $k$ generator matrix $$G_1 = \begin{array}{l} IO \;.\;.\;.\; (a_1^1 \;.\;.\;.\; a_{n-k}^1) \\ OI \qquad\qquad\qquad . \\ .\quad . \\ .\qquad . \\ .\qquad\quad I\ (a_1^k \;.\;.\;.\; a_{n-k}^k) \end{array}$$

where I is the identity element of the code alphabet and $a$ represents generally a symbol of the alphabet, wherein said code $C_0$ is a code defined by an $n$ by $k'$ generator matrix $$G_o = \begin{array}{l} IO \;.\;.\;.\;.\; (b_1^1 \;.\;.\; b_{n-k'}^1) \\ OI \qquad\qquad\qquad . \\ .\quad . \qquad\qquad\quad . \\ .\qquad . \qquad\qquad . \\ .\qquad\quad . \quad (b_1^k \;.\;.\; b_{n-k'}^k) \\ .\qquad \left( \qquad G_2 \qquad \right) \end{array}$$

where $b$ represents generally a symbol of the alphabet and where $k'>k$ and $G_2$ is an $N-k$ by $k'-k$ generator matrix, and wherein said second block code $C_2$ is a code defined by said $n-k$ by $k'-k$ generator matrix $$G_2 = \begin{array}{l} IO \;.\;.\; (b_1^{k+1} \;.\;.\; b_{n-k'}^{k+1}) \\ OI \\ .\quad . \\ .\quad I\,(b_1^{k'} \;.\;.\; b_{n-k'}^{k'}) \end{array}$$

6. The system of claim 5 wherein said second encoder includes apparatus for encoding portions of every $l^{th}$ block of the group of $fl$ information blocks most recently applied to said communication channel into an $n-k'$ symbol code word of said second block code $C_2$, where $l$ is any integer, $f=[k/(k'-k)]$, and the representation $[x]$ indicates the least integer greater than or equal to $x$.

7. The system of claim 6 further including first shift register means connected to the receiver end of said channel for receiving said resulting sequences, means responsive to the signals from said first shift register means for storing an indication of those of the $fl$ most recently received sequences which contain $r$ or less errors and an indication of those which contain greater than $r$ errors, third encoding means responsive to signals from said indication storing means for encoding portions of every $l^{th}$ one of the information blocks of said $fl$ most recently received sequences into a first code word of said second block code $C_2$ when said indication storing means indicates that every $l^{th}$ one of such sequences contains $r$ or less errors and for encoding portions of all except one of every $l^{th}$ one of the information blocks of said $fl$ most recently received sequences into a second code word of said second block code $C_2$ when said indication storing means indicates that the sequence containing said one information block contains greater than $r$ errors, means responsive to signals from said indication storing means for subtracting said first code word from the parity section of the next received sequence to obtain a first resultant, means responsive to signals from said indication storing means for processing said first resultant to correct $r$ or less errors in said next received sequence and for storing an indication in said indication storing means that said next received sequence contains $r$ or less errors, and means responsive to signals from said indication storing means for processing said first resultant to detect greater than $r$ errors in said next received sequence and for storing an indication in said indication storing means that said next received sequence contains greater than $r$ errors.

8. The system of claim 7 further including decoding means responsive to signals from said indication storing means for correcting errors in said next received sequence in accordance with the code $C_0$ when said indication storing means indicates that the sequence containing said one information block contains greater than $r$ errors, means responsive to signals from said decoding means for subtracting said second code word from said corrected next received sequence to obtain a second resultant, means responsive to signals from said means for subtracting for calculating the syndrome of said second resultant in accordance with the code $C_1$, and means responsive to signals from said indication storing means for replacing a portion of the sequence indicated as containing greater than $r$ errors with a portion of said syndrome.

9. The system of claim 8 further including means responsive to signals from said means for replacing for applying the corrected information blocks to a utilization circuit.

10. A data error-correcting system comprising a source of information blocks I, first encoding means responsive to said information source for encoding said information blocks into a code word $C_{fl}^1$ of an $(n,k)$ block code $C_1$ which is a subcode of an $(n,k')$ block code $C_0$, where the block code $C_1$ has an $r$ random error-correcting capability and where $k<k'$, means for adding portions of every $l^{th}$ one of the previously $fl-1$ encoded information blocks to obtain a first sum $I_0^f+I_l^{f-1}+\ldots+I_{(f-1)l}^1$, where $l$ is any positive integer, $f=[k/(k'-k)]$, $[x]$ represents the least integer equal to or greater than $x$, $I_0^f$ represents the last $k'-f(k'-k)$ symbols in the information block $I_0$, and the remaining $I_j^i$ represents the $i^{th}$ group of $k'-k$ symbols of the $j^{th}$ information block $I_j$, second encoding means for encoding said first sum into a code word $C_{fl}^2$ of an $[(n-k'), (k'-k)]$ block code $C_2$ which is a shortened form of the code $C_0$, means for adding the code word $C_{fl}^2$ to the parity section of the code word $C_{fl}^1$ to obtain $M_{fl}$, and means for applying the sequence obtained therefrom to one end of a communication channel.

11. A system as in clam 10 further comprising means connected to the other end of said channel for receiving and storing a sequence $M_{fl}^*$ comprising the sequence $M_{fl}$ plus any errors which may have occurred in communication, means connected to said receiving and storing means for storing $fl$ of the most recently received information blocks $I_0, \ldots, I_{fl-1}$ obtained from received sequences $M_0^*, \ldots, M_{fl-1}^*$ respectively, means for storing an indication of those of the $fl$ most recently received sequences which contain $s$ or less errors and an indication of those which contain greater than $s$ errors, where $s \leq r$, means responsive to said indication storing means indicating that every $l^{th}$ one of the previously received sequences contains $s$ or less errors for adding the portions $I_0^f, I_l^{f-1}, \ldots, I_{(f-1)l}^1$ of the stored information blocks together to obtain a second sum, third encoding means for encoding said second sum into a first code word of said block code $C_2$, means for subtracting said first code word from the parity section of $M_{fl}^*$ to obtain the code word $C'_{fl}$, means for correcting $s$ or less errors in $C'_{fl}$ and for storing an indication in said indication storing means that $M_{fl}^*$ contains $s$ or less errors, means for detecting greater than $s$ errors and for storing an indication in said indication storing means that $M_{fl}^*$ contains greater than $s$ errors, and means for storing the information block $I_{fl}$ of $M_{fl}^*$ in said $fl$ information block storing means.

12. A system as in claim 11 further comprising means responsive to said indication storing means indicating that of every $l^{th}$ one of the previously received $fl$ sequences, $M_{sl}^*$ contains greater than $s$ errors for adding portions $I_0^f, I_l^{f-1}, \ldots, I_{(s-1)l}^{f-s+1}$, $I_{(s+1)l}^{f-s-1}, \ldots, I^1_{(f-1)l}$ of the stored information blocks together to obtain a third sum, said third encoding means being arranged to encode said third sum into a second code word of said block code $C_2$, decoding means responsive to said indication storing means indicating that said sequence $M_{sl}^*$ contains greater than $s$ errors for correcting errors in the sequence $M_{fl}^*$ in accordance with the code $C_0$, means for subtracting said second code word from the parity section of said corrected sequence $M_{fl}^*$ to obtain a code word $C_{fl}''$ means for calculating the syndrome of $C_{fl}''$ in accordance with said code $C_1$, and means for replacing the stored portion $I_{z\,1}^{f-z}$ with the $k'-k$ higher order symbols of said syndrome.

13. A system as in claim 12 further including means for applying the information blocks stored in said *fl* information block storage means to a utilization circuit.

* * * * *

UNITED STATES PATENT OFFICE
CERTIFICATE OF CORRECTION

Patent No. 3,638,182 Dated January 25, 1972

Inventor(s) Herbert O. Burton, Sudhakar M. Reddy, Daniel D. Sullivan, and Shih Y. Tong It is certified that error appears in the above-identified patent and that said Letters Patent are hereby corrected as shown below:

Column 2, Line 70, "K" should read --k--.

Column 3, Lines 4 and 5, "$I_{f1}$" should read --$I_{f\ell}$--;
Line 6, "1" should read --$\ell$--;
Lines 9 and 10, "$I_{f1}$" should read --$I_{f\ell}$--;
Line 11, "$C_{f1}1$" should read --$C^1_{f\ell}$--;
Line 12, "$1^{th}$" should read --$\ell^{th}$--;
Line 13, "$I_0f$" should read --$I_0^f$--;
Line 14, "$I^1_{(f-1)1}$, where $I_0f$" should read --$I^1_{(f-1)\ell}$, where $I_0^f$--;
Line 15, "$I_ji$" should read --$I_j^i$--;
Line 18, in the equation, "$I_0f$" should read --$I_0^f$--, "$I^1_{(f-1)1}$" should read --$I^1_{(f-1)\ell}$--, "$C_{f1}2$" should read --$C^2_{f\ell}$--;
Line 20, "$C_{f1}2$", "$C_{f1}1$" and "$M_{f1}$" should read --$C^2_{f\ell}$--, --$C^1_{f\ell}$-- and --$M_{f\ell}$--, respectively;
Line 21, "$C_{f1}1$" and "$C_{f1}2$" should read --$C^1_{f\ell}$-- and --$C^2_{f\ell}$--, respectively;

USCOMM-DC 60376-P69
☆ U.S. GOVERNMENT PRINTING OFFICE : 1969 O—366-334

Line 22, "$M_{f1}$" should read --$M_{f\ell}$--;
Line 26, "semiinfinite" should read --semi-infinite--;
Line 35, "$M_{f1*}$" should read --$M^*_{f\ell}$--;
Line 36, "$M_{f1}$" should read --$M_{f\ell}$--;
Line 38, "f1-1" should read --$f\ell$-1--;
Line 51, "$M_{f1*}$" should read --$M^*_{f\ell}$--;
Line 52, "$1^{th}$" should read --$\ell^{th}$--;
Line 53, "$\bar{M}^*_1, \ldots, M^*_{(f-1)1}$" should read --$M^*_{\ell}, \ldots,$
$M^*_{(f-1)\ell}$--;
Line 54, "$I_0f, I_1^{f-1}, \ldots, I^1_{(f-1)1}$" should read
--$I_0^f, I_{\ell}^{f-1}, \ldots, I^1_{(f-1)\ell}$--;
Line 56, "$M_{f1*}$" should read --$M^*_{f\ell}$--;
Line 57, "$C_{f1}1$", both occurrences, should read --$C^1_{f\ell}$--;
Lines 58, 59 and 60, "$C_{f1}1$" should read --$C^1_{f\ell}$--;
Line 62, "$M_{f1*}$" should read --$M^*_{f\ell}$--;
Line 63, "$C_{f1}1$" should read --$C^1_{f\ell}$--;
Line 66, "$M_{f1*}$" should read --$M^*_{f\ell}$--;
Line 69, "$M_{z1*}$" should read --$M^*_{z\ell}$--;
Line 70, "$M_{f1*}$" should read --$M^*_{f\ell}$--;
Line 71, "(f-1)1. $M_{f1*}$" should read --$(f-1)\ell$. $M^*_{f\ell}$--;
Line 74, "$M_{f1*}$" should read --$M^*_{f\ell}$--;
Line 75, "$M_{z1*}$" should read --$M^*_{z\ell}$--.

Column 4. Line 1, "$I_0^f, I_1^{f-1}, \ldots, I^{f-z+1}_{(z-1)1}, I^1_{(f-1)1}$" should read
--$I_0^f, I_{\ell}^{f-1}, \ldots, I^{f-z+1}_{(z-1)\ell}, I^1_{(f-1)\ell}$--;
Line 2, "$I_{z1}$" should read --$I_{z\ell}$--;
Line 4, "$M_{f1*}$" should read --$M^*_{f\ell}$--;
Lines 7 and 8, "$I^{f-z}_{z1}$" should read --$I^{f-z}_{z\ell}$--;
Line 26, "$1^{th}$" should read --$\ell^{th}$--;
Line 27, "$\bar{f}1$" should read --$f\ell$--;
Line 31, "$I_1^{f-1}, \ldots, I^1_{(f-1)1}$" should read --$I_{\ell}^{f-1}, \ldots,$
$I^1_{(f-1)\ell}$--;

Line 53, "OR-gate" should read --OR gate;
Line 54, "$\underline{1}^{th}$" should read --$\ell^{th}$--,
"$\overline{f}1$" should read --$f\ell$--;
Line 56, "OR-gate" should read --OR gate--;
Line 61, "$\underline{1}^{th}$" should read --$\ell^{th}$--,
"$\overline{f}1$" should read --$f\ell$--.

Column 5, Line 9, "be" should read --have--;
Line 12, "$\underline{1}^{th}$" should read --$\ell^{th}$--,
"$\overline{f}1$" should read --$f\ell$--;
Line 39, "$\underline{1}$" should read --$\ell$--.

Column 6, Line 38, "$I_{41}$" should read --$I_4^1$--,
"$I_{42}$" should read --$I_4^2$--;
Line 45, "register $I_{41}$" should read --register 440; $I_4^1$--,
"$I_22$" should read --$I_2^2$--;
Line 47, "$I_{42}$" should read --$I_4^2$--,
"$I_02 + I_21$" should read --$I_0^2+I_2^1$--.

Column 7, Lines 26, 39 and 46, "AND-gate" should read --AND gate--;
Line 50, "$I\ _4$" should read --$I_4$--.

Column 8, Lines 3, 9, 38, 41, 48, 50 (both occurrences), 56,
59, 62 and 70, "AND-gate" should read --AND gate--.

Column 9, Lines 1 and 7, "AND-gate" should read --AND gate--;
Line 9, "OR-gate" should read --OR gate--;
Lines 12, 21, and 25, "AND-gate" should read --AND gate--;
Line 30, "OR-gate" should read --OR gate--;
Line 31, "AND-gates" should read --AND gates--.

Column 11, Claim 5, Line 28, "N-k" should read --n-k--;
Claim 6, Line 39, "$\underline{1}$" should read --$\ell$--;
Line 40, "$\overline{f}1$" should read --$f\ell$--;
Line 42, "$\underline{1}$" should read --$\ell$--;
Claim 7, Line 49, "$\overline{f}1$" should read --$f\ell$--;
Line 53, "$\underline{1}^{th}$" should read --$\ell^{th}$--,
"$\overline{f}1$" should read --$f\ell$--;
Lines 56 and 57, "$\underline{1}^{th}$" should read --$\ell^{th}$--;
Line 58, "f$\overline{1}$" should read --$f\ell$--.

Column 12, Claim 10, Line 21, "$C_{f1}1$" should read --$C^1_{f\ell}$--;
Line 25, "$1^{th}$" should read --$\ell^{th}$--, "$\overline{f}1$" should read --$f\ell$--;
Line 26, in the equation, "$I^f_1$" should read --$I^f_\ell$--;
Line 27, "$I^1_{(f-1)1}$" should read --$I^1_{(f-1)\ell}$--, "$\underline{1}$" should read --$\ell$--;
Line 28, "$I_0f$" should read --$I^f_0$--;
Line 30, "$I_ji$" should read --$I^i_j$--;
Line 32, "$C_{f1}2$" should read --$C^2_{f\ell}$--;
Line 34, "$C_{f1}2$" should read --$C^2_{f\ell}$--, "$C_{f1}1$" should read --$C^1_{f\ell}$--, "$M_{f1}$" should read --$M_{f\ell}$--.

Column 12, Claim 11, Line 38, "clam" should read --claim--;
Line 40, "$M_{f1*}$" should read --$M^*_{f\ell}$--, "$M_{f1}$" should read --$M_{f\ell}$--;
Line 42, "f1" should read --$f\ell$--;
Line 43, "$I_{f1-1}$" should read --$I_{f\ell-1}$--;
Line 44, "$M_{0*}$" should read --$M^*_0$--, "$M^*_{f1-1}$" should read --$M^*_{f\ell-1}$--;
Line 45, "f1" should read --$f\ell$--;
Line 49, "$\underline{1}^{th}$" should read --$\ell^{th}$--;
Line 50, in the equation, "$I^{f-1}_1$" should read --$I^{f-1}_\ell$--, "$I^1_{(f-1)1}$" should read --$I^1_{(f-1)\ell}$--;
Line 55, "$M_{f1*}$" should read --$M^*_{f\ell}$;
Line 56, both occurrences, "$C'_{f1}$" should read --$C'_{f\ell}$--;
Lines 58 and 60, "$M_{f1*}$" should read --$M^*_{f\ell}$--;
Line 61, "$I_{f1}$of $M_{f1*}$ in said f1" should read --$I_{f\ell}$ of $M^*_{f\ell}$ in said $f\ell$--;

Claim 12, Line 65, "$1^{th}$" should read --$\ell^{th}$--, "$\bar{f}1$" should read --$f\ell$--, "$M_{z1*}$" should read --$M^*_{z\ell}$--;

Lines 66 through 67, in the equation, "$I_1^{f-1}, \ldots, I^{f-z+1}_{(z-1)1}, I^{f-z-1}_{(z+1)1}, \ldots, I^1_{(f-1)1}$" should read --$I_\ell^{f-1}, \ldots, I^{f-z+1}_{(z-1)\ell}, I^{f-z-1}_{(z+1)\ell} \ldots, I^1_{(f-1)\ell}$--;

Lines 71, 72 and 75, "$M_{z1*}$" should read --$M^*_{z\ell}$--;

Line 75, "$C^{'''}_{f1}$" should read --$C^{''}_{f\ell}$--.

ɔlumn 13, Claim 12, Line 1, "$C^{'''}_{f1}$" should read --$C^{''}_{f\ell}$--;

Line 2, "$I^{f-z}_{z1}$" should read --$I^{f-z}_{z\ell}$--.

ɔlumn 14, Claim 13, Line 2, "f1" should read --$f\ell$--.

Signed and sealed this 14th day of November 1972.

SEAL)
ttest:

DWARD M.FLETCHER,JR.
ttesting Officer

ROBERT GOTTSCHALK
Commissioner of Patents